United States Patent
Hu

(10) Patent No.: US 8,359,482 B2
(45) Date of Patent: Jan. 22, 2013

(54) POWER SUPPLY CIRCUIT FOR AUDIO CODEC CHIP AND METHOD FOR PROVIDING POWER SUPPLY TO AUDIO CODEC CHIP

(75) Inventor: Ke-You Hu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 382 days.

(21) Appl. No.: 12/636,299

(22) Filed: Dec. 11, 2009

(65) Prior Publication Data

US 2011/0029794 A1    Feb. 3, 2011

(30) Foreign Application Priority Data

Jul. 29, 2009   (CN) .......................... 2009 1 0304964

(51) Int. Cl.
    *G06F 1/32*   (2006.01)
(52) U.S. Cl. ........ 713/300; 713/310; 713/320; 713/321; 713/322; 713/323; 713/324; 713/330; 713/340
(58) Field of Classification Search .................. 713/300, 713/310, 320–324, 330, 340
    See application file for complete search history.

(56) References Cited

U.S. PATENT DOCUMENTS

| | | | | |
|---|---|---|---|---|
| 5,887,177 | A  * | 3/1999 | Heyl ............................. | 713/300 |
| 6,687,371 | B1 * | 2/2004 | Fischer et al. ........... | 379/399.02 |
| 6,744,888 | B1 * | 6/2004 | El-Kik et al. ................. | 379/412 |
| 6,778,649 | B2 * | 8/2004 | Hinderks ................... | 379/93.31 |
| 2002/0039416 | A1* | 4/2002 | Parrott ......................... | 379/412 |
| 2010/0318815 | A1* | 12/2010 | Hu ................................ | 713/300 |

* cited by examiner

*Primary Examiner* — M Elamin
(74) *Attorney, Agent, or Firm* — Altis Law Group, Inc.

(57) ABSTRACT

A power supply circuit is provided. The power supply circuit includes an audio codec chip and a voltage absorbing circuit. The audio codec chip has a power input terminal. The power input terminal is connected to a power source terminal. The voltage absorbing circuit is connected between the power source terminal and the power input terminal of the audio codec chip so as to decrease a divided voltage accomplished with a voltage from the power source terminal to low level. A method configured for starting up an audio codec chip on a computer motherboard in a normal manner is also provided.

7 Claims, 4 Drawing Sheets

POWER SUPPLY CIRCUIT FOR AUDIO CODEC CHIP AND METHOD FOR PROVIDING POWER SUPPLY TO AUDIO CODEC CHIP

BACKGROUND

1. Technical Field

The present disclosure relates to power supply circuits and methods, and particularly to a power supply circuit of an audio codec chip and a method for providing power supply to the audio codec chip.

2. Description of Related Art

In computer systems, an audio codec chip is generally arranged on a computer motherboard to provide sound function for the computer. The audio codec chip is connected to a power supply terminal on the motherboard, so as to provide a working voltage for the audio codec chip. When the power supply terminal outputs 3.3 volts (V) to the audio codec chip, the voltage is divided and a small portion goes to a digital/analog signal transforming circuit (DAC) of the audio codec chip. The DAC detects the signal state of the input voltage signal. If the signal input into the DAC is at low level, the audio codec chip will start normal. If the signal input to the DAC is at high level however, then the audio codec chip will malfunction. When the computer motherboard is used with some types of power supply, such as and FSB ATX3000-68PD power supply, the divided voltage provided to the transforming circuit will be 0.9V. For some types of audio codec chip, the 0.9V voltage will be considered high rather than low level and the audio codec chip will malfunction.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
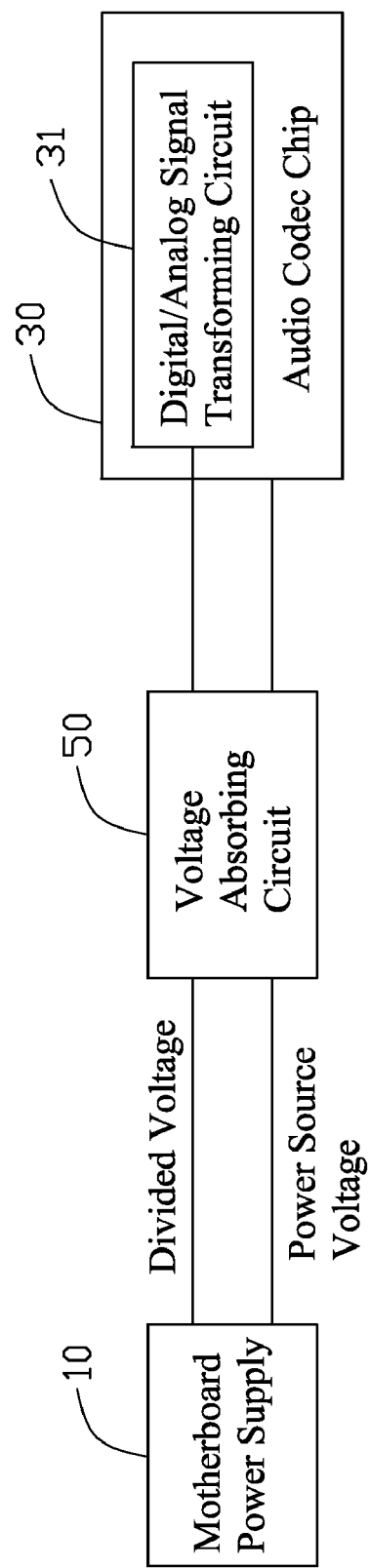
FIG. 1 is a diagram of an embodiment of a power supply circuit for an audio codec chip.
Figure 2:
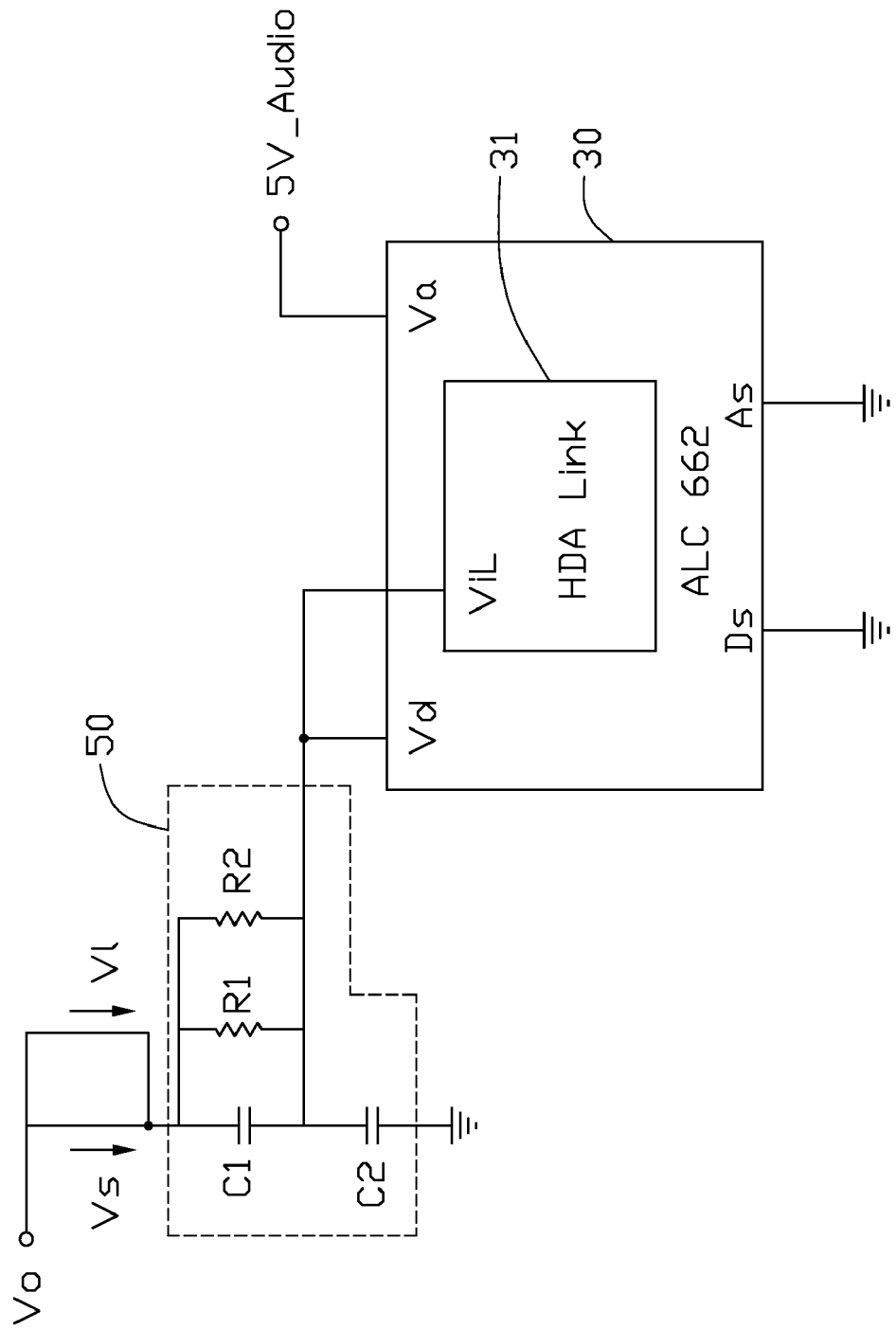
FIG. 2 is a circuit diagram of the power supply circuit of FIG. 1.

Referring to FIGS. 1 and 2, an embodiment of a power supply circuit includes a motherboard power supply 10 and an audio codec chip 30. The audio codec chip 30 includes a first power supply input terminal Vd, a second power supply power input terminal Va, and a digital/analog signal transforming circuit (DAC) 31. The DAC 31 includes an input terminal ViL. The DAC 31 is capable of determining the signal state of the input terminal ViL. When the signal input to the input terminal ViL is at low level, the audio codec chip 30 may work in a normal manner.

The power supply circuit for audio codec chip further includes a voltage absorbing circuit 50 connected between the motherboard power supply 10 and the power supply input terminal Vd. In one embodiment, the motherboard power supply 10 is an FSB ATX3000-68PD.

Referring to FIG. 2, the motherboard power supply 10 includes a first power source terminal capable of outputting 3.3 volts (V), and a second power source terminal capable of outputting 5V. The second power supply power input terminal Va is connected to the second power source terminal. The voltage absorbing circuit 50 includes a first capacitor C1, a second capacitor C2, a first resistor R1, and a second resistor R2. The first resistor R1, the second resistor R2, and the first capacitor C1 are connected in parallel, commonly connected to the first power source terminal Vo of the motherboard power supply 10, and connected to the input terminal ViL of the DAC 31 and the first power supply input terminal Vd of the audio codec chip 30. The first capacitor C1, the first resistor R1, and the second resistor R2 are connected to ground via the second capacitor C2. In one embodiment, capacitances of the first capacitor C1 and the second capacitor C2 is 4.7 microfarad for each; resistances of the first resistor R1 and the second resistor R2 is 30 ohms for each.

Figure 3:
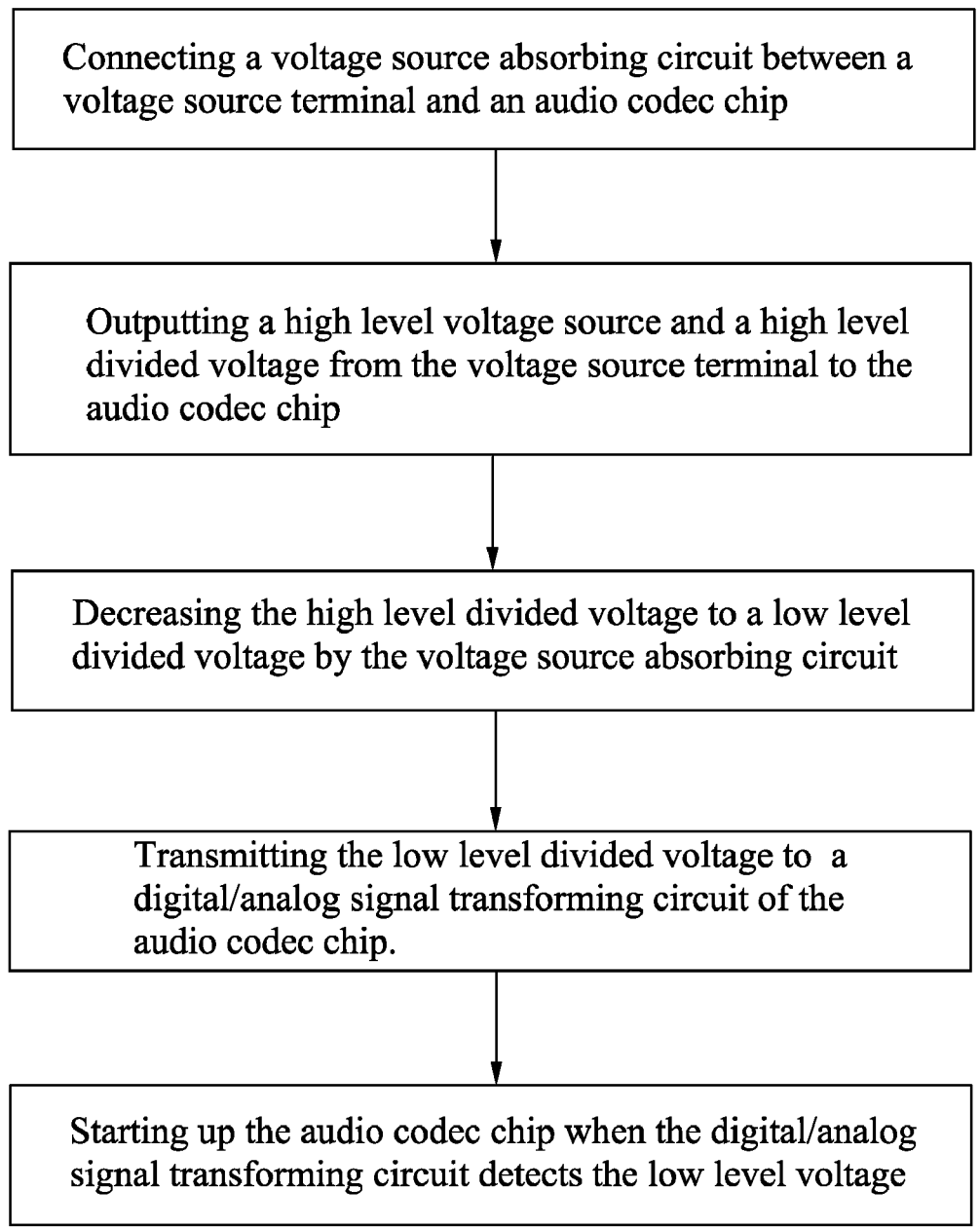
FIG. 3 and FIG. 4 are flow charts of methods for providing power to the audio codec chip.
Figure 4:
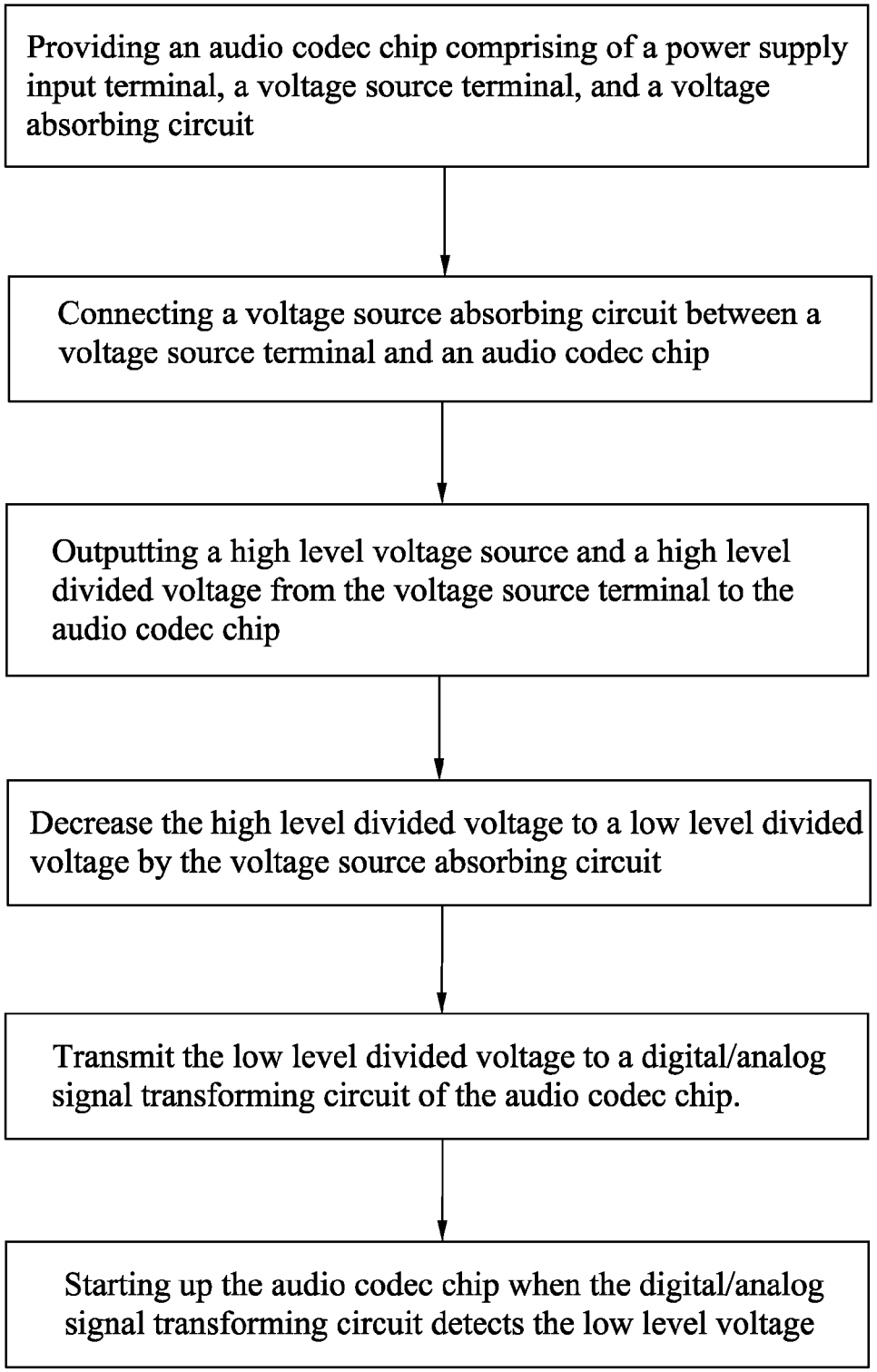

Referring also to FIGS. 3 and 4, methods for providing power supply for the audio code chip are also provided. When the motherboard power supply 10 is started, the first power source terminal Vo outputs 3.3V direct current (DC) power source voltage Vs to provide a working voltage for the audio codec chip 30. A divided voltage V1 from the DC power source voltage Vs is output to the input terminal ViL of the DAC 31 via the voltage absorbing circuit 50. To avoid the divided voltage V1 being read as a high level voltage signal by the DAC 31, the voltage absorbing circuit 50 decreases the divided voltage V1 to a level that will be read by DAC 31 as a low level signal. Thus, the audio codec chip 30 will start normally.

In one embodiment, the divided voltage V1 from the first power source terminal Vo is 0.9V. The voltage input to the DAC 31 via the voltage absorbing circuit 50 is 0.3V, so that the DAC 31 reads the input voltage as a low level signal. Thus, the audio codec chip 30 will work in a normal manner.

It is to be understood, however, that even though numerous characteristics and advantages of the embodiments have been set forth in the foregoing description, together with details of the structure and function of the present disclosure, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A power supply circuit for an audio codec chip on a computer motherboard, comprising:

an audio codec chip having a power supply input terminal, the power input terminal is connected to a power source terminal; and a voltage absorbing circuit connected between the power source terminal and the power input terminal of the audio codec chip, and the voltage absorbing circuit is capable of decreasing a divided voltage generated with a voltage output from the power source terminal to low level;

wherein the voltage absorbing circuit comprises a first capacitor, a second capacitor, a first resistor, and a second resistor, the first capacitor, the first resistor, and the second resistor are connected in parallel and connected to ground via the second capacitor.

2. The power supply circuit of claim 1, wherein the audio codec chip comprises a digital/analog signal transforming circuit, and the divided voltage is capable of being input into the digital/analog signal transforming circuit.

3. The power supply circuit of claim 1, wherein the voltage absorbing circuit is capable of decreasing the divided voltage so that the digital/analog signal transforming circuit determines the divided voltage as a low level signal.

4. A method for providing power supply for an audio code chip, comprising following steps in an order as follows:
- firstly, connecting a voltage source absorbing circuit between a voltage source terminal and an audio codec chip, wherein the voltage absorbing circuit comprises a first capacitor, a second capacitor, a first resistor, and a second resistor, the first capacitor, the first resistor, and the second resistor are connected in parallel and connected to ground via the second capacitor;
- secondly, outputting a high level voltage source and a high level divided voltage from the voltage source terminal to the audio codec chip;
- thirdly, decreasing the high level divided voltage to a low level divided voltage by the voltage source absorbing circuit; and
- fourthly, transmitting the low level divided voltage to a digital/analog signal transforming circuit of the audio codec chip.

5. The method of claim 4, wherein the method further comprises starting up the audio codec chip when the digital/analog signal transforming circuit detects the low level voltage.

6. A method for providing power supply for an audio code chip, comprising following steps in an order as followings:
- firstly, providing an audio codec chip comprising of a power supply input terminal, a voltage source terminal, and a voltage absorbing circuit, wherein the voltage absorbing circuit comprises a first capacitor, a second capacitor, a first resistor, and a second resistor, the first capacitor, the first resistor, and the second resistor are connected in parallel and connected to ground via the second capacitor;
- secondly, connecting the voltage source absorbing circuit between a voltage source terminal and an audio codec chip;
- thirdly, outputting a high level voltage source and a high level divided voltage from the voltage source terminal to the audio codec chip;
- fourthly, decreasing the high level divided voltage to a low level divided voltage by the voltage source absorbing circuit; and
- fifthly, transmitting the low level divided voltage to a digital/analog signal transforming circuit of the audio codec chip.

7. The method of claim 6, wherein the method further comprises starting up the audio codec chip when the digital/analog signal transforming circuit detects the low level voltage.

\* \* \* \* \*